United States Patent
Hahn

[19]

[11] Patent Number: 6,021,985
[45] Date of Patent: Feb. 8, 2000

[54] CLAMPING MECHANISM FOR KEYBOARD SUPPORT

[75] Inventor: Christopher T. Hahn, Cherry Creek, N.Y.

[73] Assignee: Weber Knapp Company, Jamestown, N.Y.

[21] Appl. No.: 09/112,257

[22] Filed: Jul. 8, 1998

[51] Int. Cl.[7] .............................. E04G 3/00; A47F 5/00; F16M 11/00; F16M 13/00
[52] U.S. Cl. .................................. 248/286.1; 248/284.1; 248/279.1; 248/281.11; 74/531
[58] Field of Search ............................ 248/284.1, 286.1, 248/287.1, 291.1, 292.11, 292.14, 298.1, 279.1, 281.11, 276.1, 282.1, 285.1; 74/531; 24/68 CD, 685 R, 265 CD

[56] References Cited

U.S. PATENT DOCUMENTS

| | | | |
|---|---|---|---|
| 593,719 | 11/1897 | Fuller | 248/279.1 |
| 2,348,961 | 5/1944 | Cowper | 248/284.1 |
| 2,605,648 | 8/1952 | Sanderlin et al. | 74/531 |
| 2,795,967 | 6/1957 | Wahl | 74/531 |
| 3,433,444 | 3/1969 | Smith | 248/279.1 |
| 3,908,561 | 9/1975 | Cowley | 108/6 |
| 4,560,137 | 12/1985 | Svoboda | 248/652 |
| 4,625,657 | 12/1986 | Little et al. | 108/93 |
| 4,695,024 | 9/1987 | Haven | 248/281.11 |
| 4,826,123 | 5/1989 | Hannah et al. | 248/281.11 |
| 4,976,407 | 12/1990 | Schwartz et al. | 248/118.3 |
| 5,294,087 | 3/1994 | Drabczyk et al. | 248/639 |
| 5,361,646 | 11/1994 | Venable | 74/531 |
| 5,553,820 | 9/1996 | Karten et al. | 248/276.1 |
| 5,775,657 | 7/1998 | Hung | 248/279.1 |
| 5,839,373 | 11/1998 | Lin | 248/286.1 |
| 5,924,666 | 7/1999 | Liu | 248/286.1 |

*Primary Examiner*—Derek J. Berger
*Assistant Examiner*—Michael Nornberg
*Attorney, Agent, or Firm*—Simpson, Simpson & Snyder

[57] ABSTRACT

A mechanism for supporting an auxiliary surface for vertical movement relative to a primary surface includes a pair of link elements having opposite ends pivotally connected to auxiliary and primary surface mounting elements or brackets, a first bias for opposing downwardly directed swinging movement of the link elements relative to the primary surface mounting element, a second bias for opposing pivotal downwardly directed movement of the auxiliary surface mounting element relative to the link elements, and a locking mechanism for releasably constraining swinging movement of the link elements and pivotal movement of the auxiliary surface mounting element. The locking mechanism features a roller and an operator arranged to engage with the roller when moved into a locking position to effect clamping together of the link elements and the auxiliary surface supporting element.

13 Claims, 3 Drawing Sheets

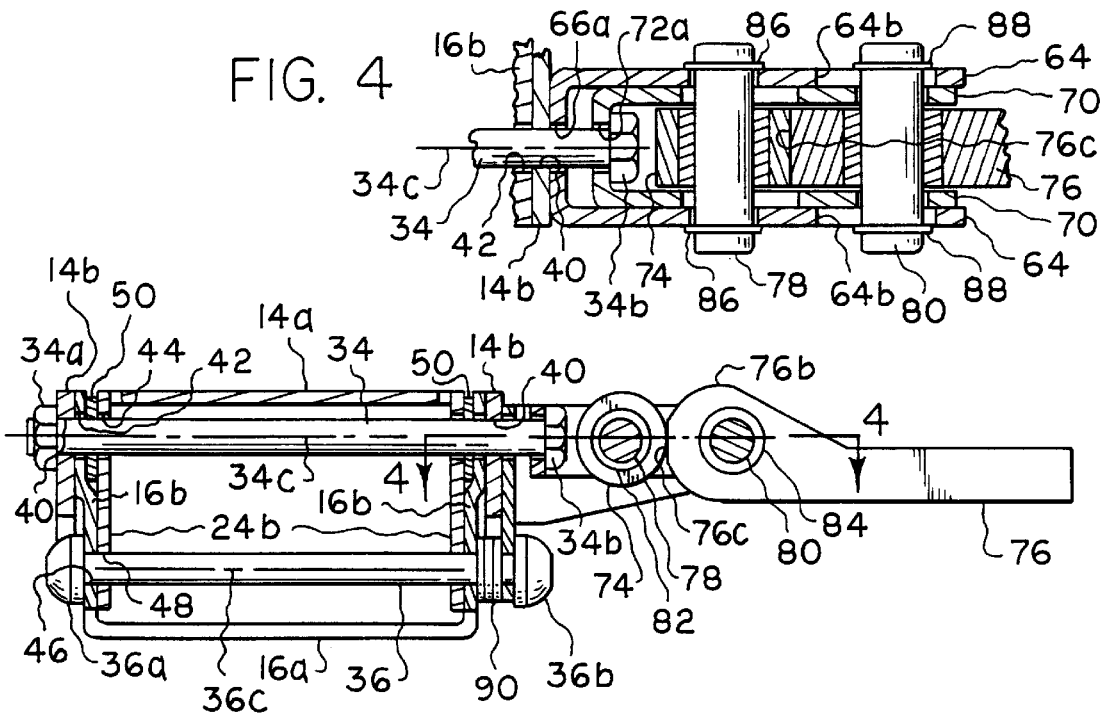
FIG. 4
FIG. 3
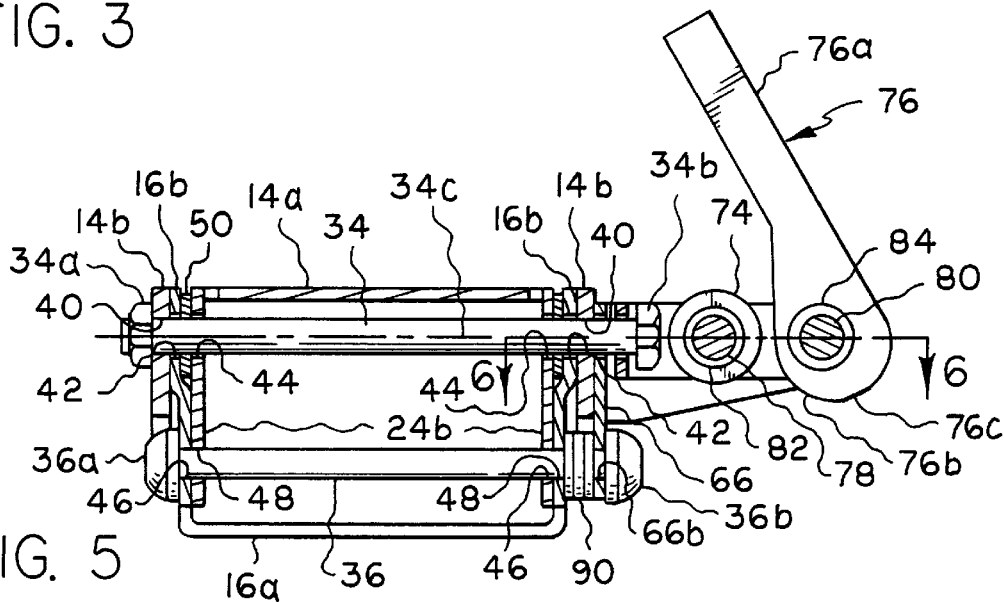
FIG. 5
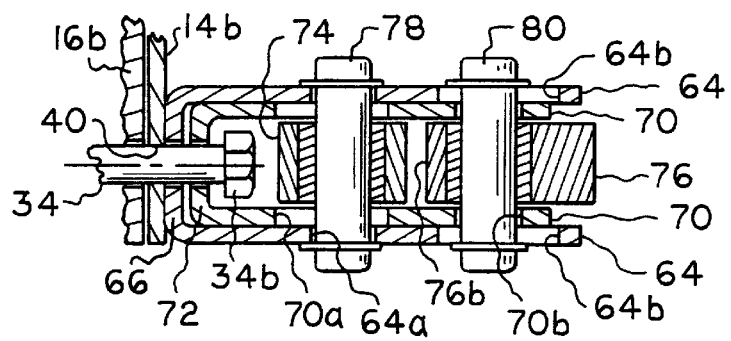
FIG. 6

CLAMPING MECHANISM FOR KEYBOARD SUPPORT

BACKGROUND OF THE INVENTION

It is known to support an auxiliary surface, such as may be defined by a keyboard supporting tray, for vertically swinging movement relative to a primary surface, such as may be defined by the top of a table or work station, by a mechanism including a pair of link elements each having first and second ends thereof pivotally connected to an auxiliary surface mounting element or bracket and a primary surface mounting element or bracket, respectively. Such mechanisms typically include a counterbalance spring tending to bias the auxiliary surface mounting element and link elements upwardly relative to the primary surface mounting element, and a manually operable locking mechanism serving to releasably retain the auxiliary surface in a desired vertical position.

It has also been proposed to provide an additional bracket serving to interconnect the auxiliary surface mounting element to the link elements in a manner allowing downwardly directed tilting movement of the auxiliary surface in combination with an additional manually operable locking mechanism serving to releasably retain the auxiliary surface in a desired tilted position.

Known clamping mechanisms are disclosed by U.S. Pat. Nos. 3,908,561; 4,625,657; 4,976,407 and 5,294,087.

SUMMARY OF THE INVENTION

The present invention relates to improvements in mechanisms for supporting an auxiliary surface for vertical movement relative to a primary surface.

More particularly, the present invention relates to clamping mechanisms adapted for use with computer furniture, and more particularly, to clamping mechanisms adapted for use in releasably retaining a vertically adjustable support or auxiliary surface in a desired vertical position relative to a base or primary surface.

The present clamping mechanism is specifically disclosed for use in combination with a parallelogram type linkage serving to support a surface, such as may be defined by a keyboard supporting platform or tray, for vertical movement relative to a base.

The linkage includes a first or surface supporting element, a second or base supported element and a pair of link elements having first or front, and second or rear ends thereof pivotally coupled to the elements, so as to permit vertical movement of a surface relative to a base.

A first pivot pin carried by a first end of the first link element is slidably received in first and second arculate slots defined by the first end of the second link element and the first element. A second pivot pin pivotally connects the first end of the second link element and the first element. These pivot pins are parallel and the first and second slots are disposed equidistant from an axis of the second pivot pin.

A return spring is provided to bias the first element for upwardly directed tilting movement about the second pivot pin and a counterbalance spring is provided to bias the first element to swing upwardly relative to the second element.

The clamping mechanism serves to simultaneously releasably clamp the first element against tilting and swinging movement. In a preferred construction, the clamping mechanism comprises first and second members with the first member arranged to clampingly engage the first link element and the second member arranged to engage with an end of the first pivot pin, a roller supported on one of the members, and a manual operator having a cam surface and being supported on the other of the members for movement between release and clamping positions. Upon movement of the operator into its clamping position, the cam surface engages with the roller to effect clamping of the first link element relative to the first element.

The combination of a rotatable roller and operator provides for smooth clamping and release operations.

BRIEF DESCRIPTION OF THE DRAWINGS

The nature and mode of operation of the present invention will now be more fully described in the following detailed description taken with the accompanying drawings wherein:

FIG. 3 is a sectional view taken generally along the line 3—3 in FIG. 1;

FIG. 4 is a sectional view taken generally along the line 4—4 in FIG. 3;

FIG. 5 is a sectional view similar to that of FIG. 4, but showing the manual operator in release position;

FIG. 6 is a sectional view taken generally along the line 6—6 in FIG. 5; and

DETAILED DESCRIPTION

Figure 1:
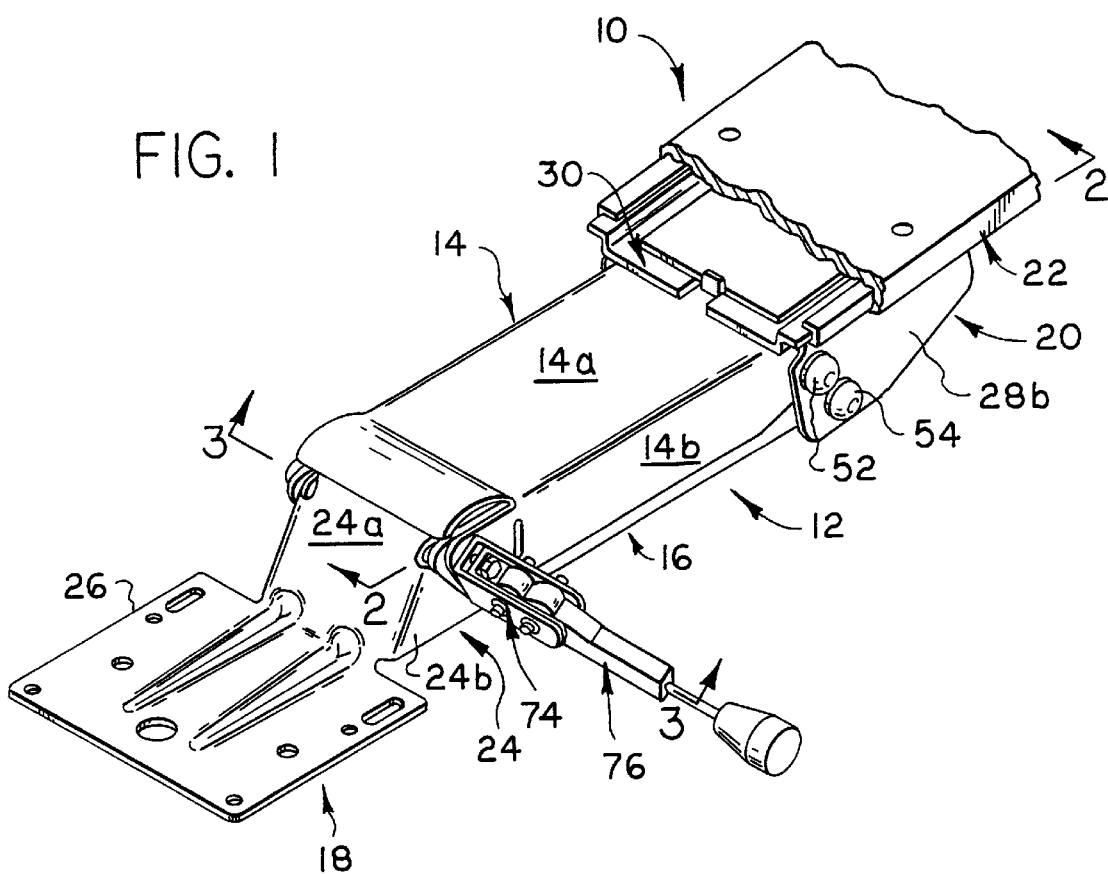
FIG. 1 is a prospective view of a keyboard mechanism incorporating the invention.

Reference is first made to FIG. 1, wherein a keyboard supporting mechanism formed in accordance with the present invention is designated as 10, and shown as generally including a linkage 12 comprising first or upper and second or lower link elements 14 and 16 having first or front ends pivotally connected to a first element in the form of a bracket 18 and second or rear ends pivotally connected to a second element in the form of a mechanism mounting bracket 20. Bracket 18 may be suitably fixed to a keyboard supporting tray, not shown, and mounting bracket 20 may be directly fixed or indirectly slidably fixed, as by a guide 22, to a suitable base, such as the top of a table or work station, also not shown. Preferably, link elements 14 and 16, and first and second elements 18 and 20 may cooperate to define a parallelogram linkage.

Link elements 14 and 16 are best shown in FIGS. 1, 2, 3, and 5, as being of generally U-shaped configuration having upper and lower bridging panels 14a and 16a, respectively, and parallel and vertically extending side panels 14b,14b and 16b,16b, respectively, wherein the inwardly facing surfaces of side panels 14b,14b are parallel to and closely adjacent the outwardly facing surfaces of side panels 16b, 16b.

First element 18 is shown as comprising a generally first U-shaped mounting portion 24 having a bridging panel 24a and a pair of parallel side panels 24b,24b arranged with their oppositely-facing or outer surfaces disposed in a closely-spaced and parallel relationship to the facing or inner surfaces of side panels 16b and 16b. Bridging panel 24a is also formed integrally with a mounting plate 26 adapted for mounting a keyboard supporting tray or other suitable work surface, not shown.

Second element 20 is shown as comprising a generally U-shaped mounting portion 28 having a bridging panel 28a and a pair of parallel side panels 28b and 28b arranged with their facing or inner surfaces disposed in a parallel relationship and relatively adjacent the oppositely or outwardly-facing surfaces of side panels 14b and 14b; and a slide plate portion 30, which is adopted to be mounted on guide 22 for sliding movement lengthwise thereof and connected by a bearing device, not shown, to mounting portion 28 to permit movement of the latter about a vertically disposed pivot axis.

The first ends of link elements 14 and 16 are connected to first element 18 by first pivot means, shown as including a first or upper and a second or lower pivot pins 34 and 36. Upper pivot 34 has enlarged first and second ends 34a and 34b disposed outwardly of the oppositely facing or outer surfaces of side panels 14b,14b, as best shown in FIGS. 3 and 5. Lower pin 36 has enlarged first and second ends 36a and 36b disposed outwardly of the oppositely facing or outer surfaces of side panels 16b,16b, also as best shown in FIGS. 3 and 5. Pivot pin 34 has its mid-portion arranged to extend through bore openings 40,40 formed in side panels 14b,14b; arculate slots 42,42, formed in side panels 16b,16b; and arculate slots 44,44 formed in side panels 24b,24b. Slots 42,42 and 44,44 are arranged equidistant from the pivot axis 36c of pivot pin 36. Pivot pin 36 has its mid-portion arranged to extend through bore openings 46,46 formed side panels 16b,16b and bore openings 48,48 formed in side panels 24b,24b. Spacer rings 50,50 surround pivot pin 34 intermediate side panels 16b,16b and 24b,24b.

Second ends of link elements 14 and 16 are connected to second element 20 by second pivot means including upper end and lower pivot pins 52 and 54, with a pivot pin 52 having its opposite ends received within aligned bore openings, not shown, provided in adjacently disposed side panels 28b and 14b, and pivot pin 54 having its opposite ends received within aligned bore openings, not shown, provided in adjacently disposed side panels 28b and 16b. Pivot pins 52 and 54 are parallel to each other and pivot pins 34 and 36.

Figure 2:
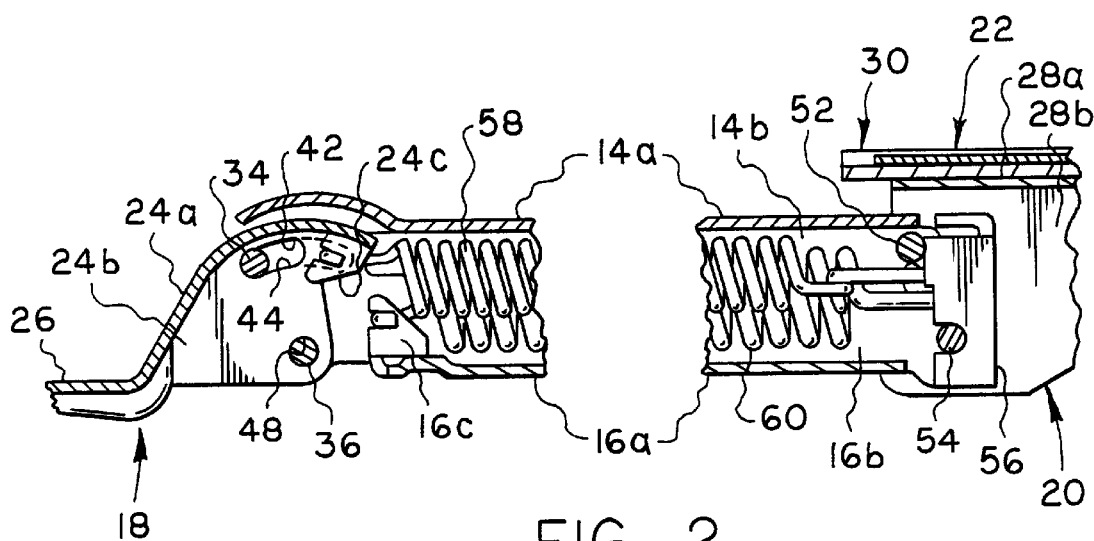
FIG. 2 is a fragmentary sectional view taken generally along the line 2—2 in FIG. 1.
Figure 7:
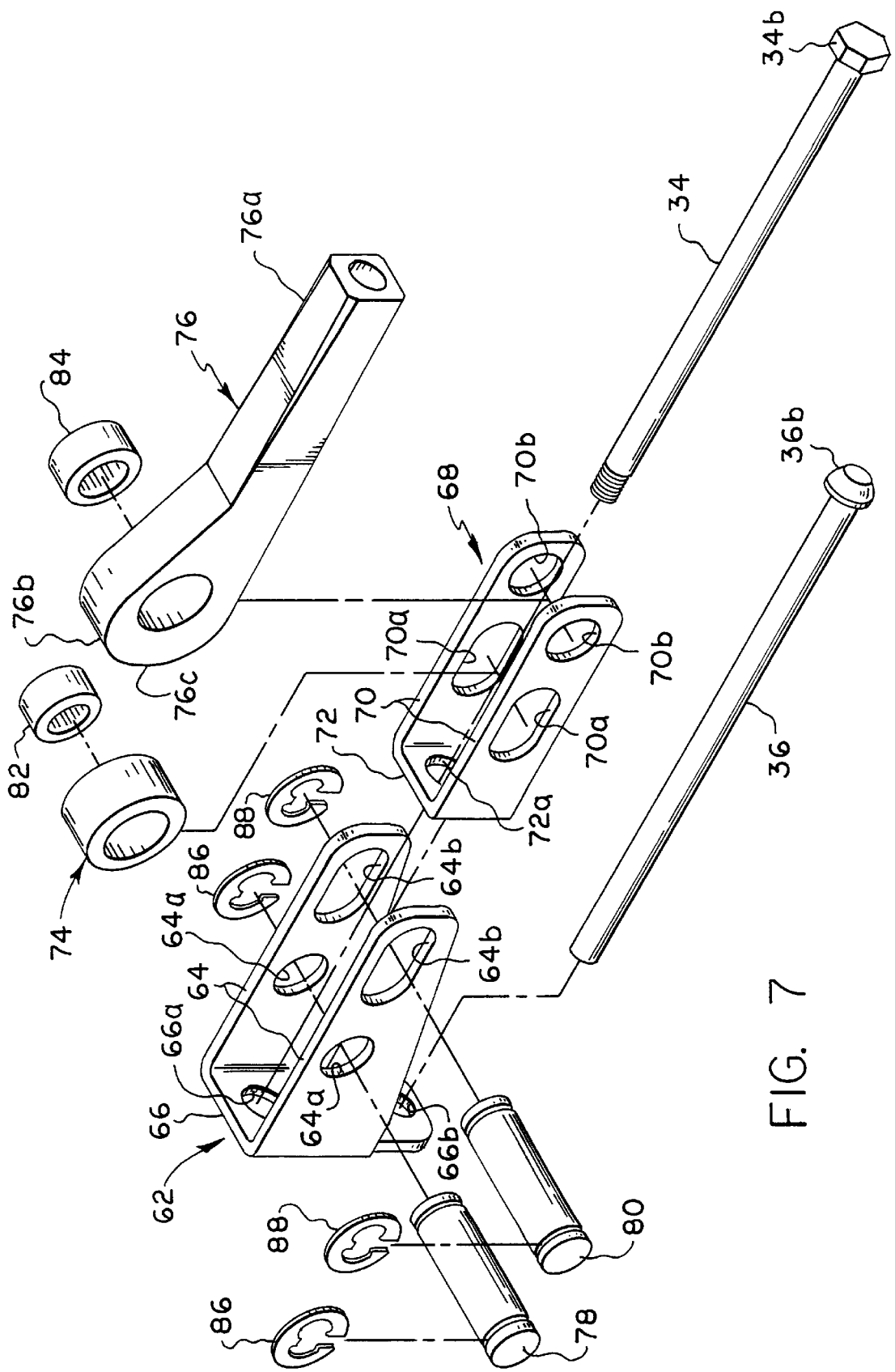
FIG. 7 is an exploded view showing the clamping mechanism.

A spring mounting bracket 56 is shown in FIG. 2 as being arranged within second element 20, and disposed to bear against pivot pins 52 and 54. Spring mounting bracket 56 is suitably connected to the rear ends of return and counterbalance springs 58 and 60, whose forward ends are connected to bracket tabs 24c and 16c, formed internally with a rearwardly disposed edge of panel 24a of first element 18 and a forwardly disposed edge of panel 16a of lower link 16, respectively.

Return spring 58 tends to bias first element 18 for upwardly directed tilting movement in a direction extending clockwise of lower pivot pin axis 36c into an uppermost tilt position defined for instance by engagement of pivot pin 34 with the left hand end of slot 44, as shown in FIG. 2. When the clamping mechanism of the present invention to be described is in its released position shown in FIG. 5, first element 18 may be swung counterclockwise against the bias of return spring 58 about lower pivot pin 36 until it assumes a lower tilted position, not shown, defined for instance by engagement of pivot pin 34 with the right hand end of slot 44, as will become apparent from viewing FIG. 2.

Counterbalance spring 60 tends to bias first element 18 to swing upwardly relative to second element 20 from a suitably lower storage position, not shown, through intermediate use positions, only one of which is shown in FIGS. 1 and 2, into a suitably defined upper use position, also not shown. When the above mentioned clamping mechanism is in its clamping position shown in FIGS. 1, 3 and 4, first element 18 is clamped against tilting or pivotal movement about pivot pin 36 and against vertical swinging movements relative to second element 20. When the clamping mechanism is in its release position shown in FIGS. 5 and 6, return spring 58 cooperates with counterbalance spring 60 to bias the first element for vertical movement relative to the second element.

The clamping mechanism of the present invention is best shown in FIGS. 3–7 as including a first member 62 of generally U-shaped configuration having a pair of parallel side flanges 64 and 64 coupled by a connecting or base flange 66; a second member 68 of generally U-shaped configuration having a pair of parallel side flanges 70 and 70 coupled by a connecting flange 72; a roller 74; a manual operator 76 having an elongated handle portion 76a and a cam surface 76b terminating in a flat clamping or retaining surface 76c; mounting pins 78 and 80; bearing devices 82 and 84 adapted for journaling roller 74 and operator 76 on mounting pins 78 and 80, respectively; and pairs of snap-type locking rings 86 and 88 for locating mounting pins 78 and 80 relative to members 62 and 68.

In the illustrated construction, side flanges 64 and 64 are formed with aligned bore openings 64a and 64a sized to slidably receive pivot pin 78 and aligned slot openings 64b and 64b, sized to slidably receive pivot pin 80.

Connecting flange 66 is formed with a first bore opening 66a sized to slidably receive upper pivot pin 34 and a second bore opening 66b, sized to slidably receive lower pivot pin 36.

Side flanges 70 and 70 are formed with aligned slot openings 70a and 70a, which are sized to slidably receive pivot pin 78 and arranged for alignment with bore openings 64a and 64a of side flanges 64 and 64, and aligned bore openings 70b and 70b, which are sized to slidably receive pivot pin 80 and arranged for alignment with slot openings 64b and 64b. Connecting flange 72 is formed with a first bore opening 72a sized to slidably receive upper pivot pin 34, while permitting the inner surface of such connecting flange to engage with second end 34b.

As will be apparent from viewing FIGS. 3–7, roller 74 is mounted by bearing 82 on first pivot pin 78, which extends through bore openings 64a and 64a and slots 70a and 70a, and has its opposite ends fixed against axial movement relative to side flanges 64 and 64 by locking rings 86 and 86; and manual operator 76 is mounted by bearing 84 in pivot pin 80, which extends through slot openings 64b and 64b and bore openings 70b and 70b, and has its opposite ends fixed against axial movement relative to side flanges 64 and 64 by locking rings 88 and 88. With this construction, roller 74 and operator 76 are considered as being rotatably supported by members 62 and 68, respectively. Preferably, second member 68 is slidably nested within first member 62 with the outer or oppositely-facing surfaces of side flanges, 70 and 70 disposed parallel and relatively closely adjacent the inner or facing surfaces of side flanges 64 and 64.

The outwardly facing surface of connecting flange 66 is arranged to loosely bear on an outwardly facing surface of a right-hand side panel 14b, as viewed in FIGS. 3–6, and the clamping mechanism is constrained against rotation about axis 34c of upper pivot pin 34, due to receipt of lower pivot pin 36 within bore opening 66b. A suitable spacer, such as may be defined by a stack of washers 90 is arranged concentrically of lower pivot pin 36 intermediate the outwardly facing surface of a right hand side panel 16b of link element 16 and the outwardly facing surface of connecting flange 66 in order to maintain the connecting flange generally parallel to side panel 14b.

In operation, operator 76 may be manually moved between its clamping position shown in FIGS. 3 and 4 and the release position shown in FIGS. 5 and 6. As an incident to movement of operator 76 into its clamping position, its caming surface 76b is first brought into engagement with roller 74, whereafter the roller and first member 62 are forced to move relatively away from second end 34b of pivot pin 34 in a direction towards first end 34a, thereby to effect clamping of link elements 14 and 16 relative to first element 18, until operator 76 is moved into its clamping position defined by engagement of surface 76c with the roller. Specifically, when caming surface 76b is brought into engagement with roller 74, second member 68 is initially forced to slide relative to first member 62 to position the inner surface of connecting flange 72 in underlying engagement with the second end 34b of upper pivot pin 34 and the outer surface of connecting flange 66 in engagement with the outwardly facing surface of the right hand side panel 14b as viewed in FIG. 4. Thereafter, pivot pin 34 is tensioned, whereby to effect clamping of side panels 14b, 16b, 24b and spacer ring 50 on each side of the linkage 12. After, clamping is effected to a degree sufficient to prevent pivotal movement of link elements 14 and 16 relative to first element 18, further rotating movement of operator 76 will move flattened surface 76c into engagement with roller 74, which serves to define the clamping position of the operator shown in FIGS. 3 and 4, wherein handle 76a of operator 76 extends in a direction away from link elements 14 and 16 in substantial alignment with pivot axis 34c, whereby to conveniently position the handle for subsequent release by an operator. Tension applied to pivot pin 34 incident to the clamping operation operates to retain flattened surface 76c in engagement with roller 74 until manual force is again applied to operator 76 for purposes of rotating same into its release position shown in FIGS. 5 and 6, wherein first element 18 is freed for vertical movement relative to second element 20 and for tilt adjusting pivotal movement about axis 36c independently of vertical displacement thereof relative to the second element.

It is contemplated that the structure of the clamping mechanism may be modified by mounting roller 74 on second member 68 and operator 76 on first member 62. In both constructions, the operator and roller cooperate to provide for smooth and relatively effortless clamping and release operations. Further, it is contemplated that first member 62 may be suitably fixed to side panel 14b, such as by welding or interengaging tabs, whereby to avoid the need for coupling the first member to lower pivot pin 36.

What is claimed is:

1. In a linkage for supporting a surface for vertical movement relative to a base, said linkage including a first element adapted to be connected to said surface, a second element adapted to be connected to said base, a pair of link elements and pivot means for pivotally connecting opposite ends of said link elements to said first and second elements, said pivot means including a pivot pin for pivotally connecting one end of one of said link elements to one of said elements for pivotal movement about a pivot axis, said pivot pin having first and second ends, and said one link element and said one of said elements being deposed intermediate said first and second ends, the improvement for releasably clamping said link element against movement relative to said one of said elements about said pivot axis, which comprises:
    a first member;
    a second member coupled to said second end of said pivot pin;
    a roller rotatably supported by one of said first and second members;
    a manual operator rotatably supported by the other of said first and second members for movement between a release position and a clamping position, said operator being arranged to engage with said roller upon movement into said clamping position to move said first member relatively away from said second end of said pivot pin in a direction towards said first end of said pivot pin to effect clamping of said one link element relatively to said one of said elements between said first member and said first end of said pivot pin.

2. The improvement of claim 1, wherein one of said first and second members engage with one of said linkage for constraining rotation of said first and second members relative to said linkage about said pivot axis.

3. The improvement of claim 1, wherein said first and second members engage for relative sliding movement in alignment with said pivot axis.

4. The improvement of claim 3, wherein one of said first and second member engages with said linkage to constrain said members against rotation relative to said linkage about said pivot axis.

5. The improvement of claim 1, wherein said first and second members are of U-shaped configuration each having a connecting flange formed with a bore opening for slidably receiving said pivot pin and a pair of parallel side walls, said side walls of said first member slidably supporting said side walls of said second member, said roller is rotatably supported by said side walls of one of said members, and said operator is rotatably supported by said side walls of the other of said members.

6. The improvement of claim 5, wherein one of said members engages with said linkage to constrain said members against rotation relative to said linkage about said pivot axis.

7. The improvement according to claim 5, wherein another pivot pin is provided for connecting an other of said link elements to said first element, and said first member is arranged to clampingly engage with one of said link elements and said element and has said connecting flange thereof formed with a second opening for slidably receiving said other pivot pin.

8. The improvement according to claim 7, wherein said roller is supported by said first member.

9. In the combination of a pair of link elements, first and second elements, pivot means for pivotal connecting opposite ends of said link elements to said first and second elements for supporting said first element for vertical movement relative to said second element, and clamping means for releasably retaining said first element in a desired vertical position relative to said second element, said pivot means including a pivot pin for pivotally connecting one of said link elements to said first element for pivotal movement about a pivot axis, the improvement wherein said clamping means comprised:
    a first member arranged to bear on one of said one link element and said first element;
    a second member coupled to said pivot pin;
    a roller rotatably supported by one of said first and second members;
    an operator rotatably supported by the other of said first and second members for movement from a release position to a clamping position and arranged to engage with said roller upon movement into said clamping position to effect clamping of said one of said link elements against said first element to constrain said pivotal movement about said axis.

10. In the combination of a linkage having a link element connected by a pivot pin to an element for pivotal movement about a pivot axis, said pivot pin having first and second ends and said link element and said element being disposed intermediate said ends; and a clamping mechanism for releasably clamping said link element against pivotal movement relative to said element, the improvement wherein said clamping mechanism comprises:

a first member;

a second member coupled to said second end of said pivot pin;

a roller rotatably supported by one of said first and second members;

an operator rotatably supported by the other of said first and second members for movement between a release position and a clamping position, said operator being arranged to engage with said roller upon movement into said clamping position to move said first member relatively away from said second end of said pivot pin in a direction towards said first end of said pivot pin to effect clamping of said link element against movement relative to said element.

11. The combination of claim 10, wherein one of said first and second members engages with one of said link elements and serves to constrain said mechanism against rotation about said pivot axis.

12. The combination of claim 10, wherein said first and second members engage for relative sliding movement in alignment with said pivot axis.

13. The combination of claim 10, wherein said operator includes a cam surface engageable with said roller and an elongated handle, and said handle extends along said pivot axis in a direction away from said linkage when in said clamping position.

* * * * *